Oct. 2, 1956 R. N. GREEN 2,764,913
DUAL SIDE VIEW VEHICLE REFLECTOR
Filed Jan. 28, 1953
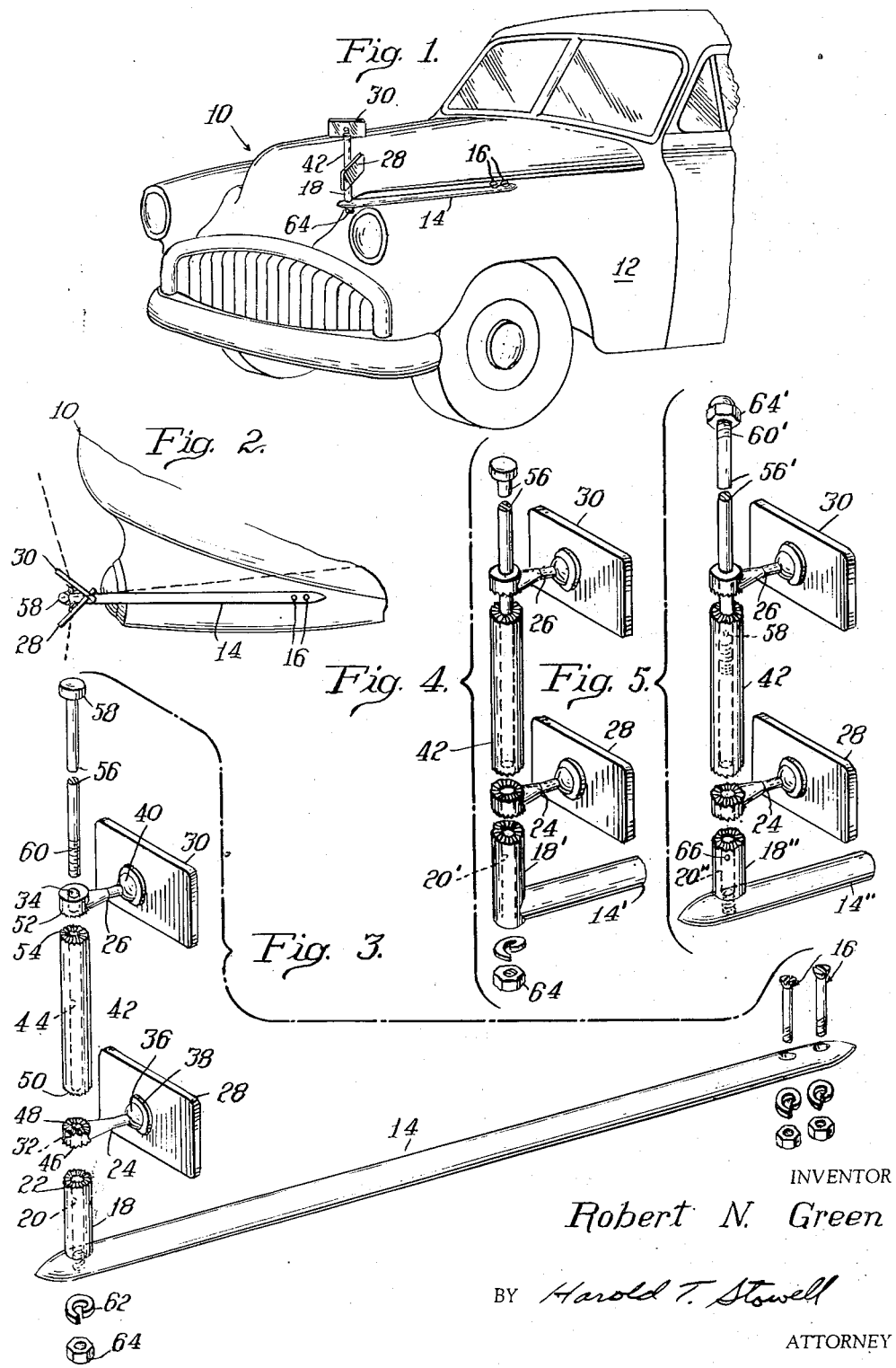
INVENTOR
Robert N. Green
BY Harold T. Stowell
ATTORNEY United States Patent Office 2,764,913
Patented Oct. 2, 1956

2,764,913

DUAL SIDE VIEW VEHICLE REFLECTOR

Robert N. Green, Buffalo, N. Y.

Application January 28, 1953, Serial No. 333,801

2 Claims. (Cl. 88—86)

This invention relates to reflectors for automotive vehicles and in particular to an improved side view reflector to be mounted on the forward end of a vehicle whereby the operator may detect the presence of oncoming traffic at intersections without thrusting unnecessarily the forward end of the vehicle into the path of the unseen traffic.

It is a primary object of this invention to provide such a device that is of a standard length and height and is readily adjustable in angle of reflection, whereby the device may be used on an extremely wide variety of vehicles and may be quickly and easily adjusted after installation on a given vehicle to accommodate different operators.

A further object is to provide a side view reflector that is simple and inexpensive to install.

A further object is to provide such a device that is simple as to its parts and inexpensive to manufacture.

These and other objects and advantages are provided by the improved side view reflector of the invention which generally comprises an elongated support member, mounting means at one end of the support member for securing the support member in substantially a horizontal plane from the forward end of a motor vehicle, an upwardly projecting element at the other end of the support member, the upwardly projecting member having an axial bore, a pair of brackets, each of the brackets having a reflector adjustably mounted on one end, and a bore complementary to the bore in the upwardly projecting element in the other end, and means adjustably securing the said other end of the brackets in spaced superposed relation to the upwardly projecting element, the means including a tubular spacer positioned between the said other ends of the brackets, and a tie rod in engagement with the bore in the upwardly projecting element and passing through the bores in the spacer and the brackets.

The invention will be more fully described with reference to the illustrative embodiments of the invention shown in the accompanying drawings in which:

Fig. 1 is a front side elevation of the device of this invention installed on a motor vehicle;

Fig. 2 is a top plan view of the device shown in Fig. 1;

Fig. 3 is an expanded view of the preferred embodiment of the side view reflector of the invention;

Fig. 4 is a fragmentary view of a modified form of the support member of the invention; and Fig. 5 is a fragmentary view of still another form of the support member of the invention.

In the drawings, 10 indicates the forward portion of a motor vehicle having a front left fender 12 to which an elongated support member 14 is secured by bolts 16. In the preferred form of the invention the rearward portion of the support member 14 is shaped to provide good contact between the fender of the vehicle and the tubular supports.

At the forward end of the support member 14 there is provided an upwardly projecting member 18. As shown in Fig. 3 of the drawing, the member 18 may be formed as an integral portion of the horizontal support 14, and have a bore 20 which extends axially therethrough. The upper end of the support member 18 is preferably serrated as at 22 to prevent the reflectors from being unintentionally pivoted as to be more fully disclosed hereinafter.

A pair of brackets 24 and 26 having a reflector or mirror 28 and 30, respectively, mounted on one end and a bore 32 and 34, respectively, complementary to the bore 20, in the other end are adjustably secured in spaced superposed relation from the upwardly projected member 18.

In the preferred form of the invention, bracket 24 is provided with a ball 36 which is adjustably secured to the reflector 28 by an internally threaded gland 38, whereby the reflector may be adjustably positioned relative to the bracket 24. The upper reflector 30 is similarly mounted to bracket 26 through the ball and socket joint generally designated 40. It is evident that other forms of pivotal connections may be employed between the mirrors and their respective brackets, and that the internally threaded gland 38 may be replaced by a pierced boss as is well known in the art.

The brackets 24 and 26 are positioned in spaced superposed relationship by a cylindrical spaced member 42 which has an axial bore 44 therethrough.

The upper and lower ends of bracket 24 are preferably serrated as at 46 and 48 which correspond to the serratures 22 of support member 18 and the serratures 50 at the lower end of the spacer member.

The lower end of bracket 26 is similarly provided with serrations 52 which are complementary to serratures 54 at the upper end of the spacer member 42.

The reflector assembly is adjustably secured together by means of a tie rod 56. The outside diameter of rod 56 is such that it will snugly slip through the bores 32 and 34 of brackets 24 and 26, the bore 44 of spacer 42, and the bore 20 of member 18. The upper end of the rod 56 has a head 58, while the lower end is provided with screw threads 60. A nut and lock washer 62 and 64 bears against the under side of support rod 14 when the nut engages the threads 60 at the lower end of the tie rod.

Upon the initial installation of the side view reflector upon a motor vehicle, the nut 64 is loosened so that the brackets 24 and 26 may be rotated about the rod 56. Each bracket is then roughly adjusted to the proper angular displacement so that one mirror provides a reflection to the left and the other to the right side of the motor vehicle, as shown more clearly by the dotted lines in Fig. 2 of the drawing. The nut 64 is then cinched.

After the initial installation of the reflector device on a given vehicle any further adjustment which may be required of the reflectors 28 and 30 to accommodate different operators can generally be made at the ball and socket joints at each reflector.

With reference to Fig. 4 of the drawing there is shown a fragmentary view of a modified form of the invention. In this form of the invention the upwardly projecting member is in the form of a cylindrical tube 18' having a bore 20'. The tube 18' is secured at right angles to the end of the horizontal support member 14', for example, by welding. Thus nut 64 bears against the lower end of the tube 18' when it is in engagement with the threads 60 of tie rod 56. The other elements of the modified side view reflector are the same as shown and described with reference to Figs. 1 through 3 and are designated with the same reference numerals.

In Fig. 5 another form of the invention is shown. Due to the similarity between the form of the invention shown in Fig. 5 and those disclosed in reference to Figs. 1 through 4, identical elements are provided with the same references and the modified elements are designated with prime and double prime reference numerals.

In Fig. 5 the elongated support member 14" is formed as an integral part of the upwardly projecting element 18″. In the upper end of element 18″ there is provided an axially extending bore 20″. As is shown in the drawings, the bore 20″ does not extend through the length of element 18″, but terminates short thereof to provide a socket for the lower end of a tie rod 56′. The tie rod is secured in the socket by means of a pin 66 which snugly fits in a radial bore in the element 18″ and a complementary bore 68 in the tie rod.

The upper end of the rod 56′ is provided with screw threads 60′ which are adapted to receive a cap nut 64′. It will thus be seen that in this form of the invention the cap screw 64′ is loosened in order to adjust the angular displacement of the reflector supporting brackets 24 and 26.

From the foregoing detailed description of the invention it will be seen that the side view reflector fulfills the aims, objects and advantages of the invention. It will be further apparent that various modifications may be made in the form of the invention by those skilled in the art without departing from the teachings of the invention; for example, the reflectors 28 and 30 may have concave or convex surfaces.

I claim:

1. A side view reflector for a motor vehicle comprising an elongated support member, mounting means at the rearward end of said member for securing the support member in substantially a horizontal plane from the forward end of a motor vehicle, an upwardly projecting element at the forward end of said support member, said upwardly projecting element having an axial bore, a pair of brackets, each of said brackets having a reflector adjustably mounted on one end and a bore complementary to the bore in said upwardly projecting element in the other end, and means adjustably securing said other end of said brackets in spaced superposed relation to said upwardly projecting element whereby images from the left and the right of vehicle are projected into the line of vision of the driver of the vehicle, said means including a tubular spacer positioned between the ends of the brackets containing said bore, and a tie rod in engagement with the bore in the upwardly projecting element and passing through said bores in said spacer and said brackets.

2. A side view reflector for a motor vehicle as defined in claim 1 wherein said other ends of said brackets and the corresponding ends of the tubular spacer and the upper end of the upwardly projecting element have complementary serrations to immobilize the brackets and prevent unintentional changes in positions thereof.

References Cited in the file of this patent

UNITED STATES PATENTS

| 1,547,794 | Curry | July 28, 1925 |
| 1,565,291 | Pearch | Dec. 15, 1925 |
| 2,132,026 | Griffith | Oct. 4, 1938 |

FOREIGN PATENTS

| 488,652 | Germany | Jan. 4, 1930 |
| 601,190 | Germany | Aug. 10, 1934 |